United States Patent
Komatsubara et al.

(10) Patent No.: US 9,501,252 B2
(45) Date of Patent: Nov. 22, 2016

(54) METHOD AND APPARATUS FOR SECURE IMAGE DATA PROCESSING

(71) Applicant: FUJI XEROX CO., LTD., Tokyo (JP)

(72) Inventors: Keisuke Komatsubara, Kanagawa (JP); Yuko Uehara, Kanagawa (JP); Yuki Yamanaka, Kanagawa (JP); Shigeru Yoneda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/705,464

(22) Filed: May 6, 2015

(65) Prior Publication Data

US 2016/0117137 A1 Apr. 28, 2016

(30) Foreign Application Priority Data

Oct. 24, 2014 (JP) ................. 2014-217321

(51) Int. Cl.
*G06K 15/00* (2006.01)
*G06F 3/12* (2006.01)

(52) U.S. Cl.
CPC .......... *G06F 3/1238* (2013.01); *G06F 3/1236* (2013.01); *G06F 3/1286* (2013.01); *G06F 3/1287* (2013.01); *G06F 3/1291* (2013.01)

(58) Field of Classification Search
None
See application file for complete search history.

(56) References Cited

U.S. PATENT DOCUMENTS

| 8,384,940 B2 | 2/2013 | Sako et al. | |
| 2005/0141014 A1* | 6/2005 | Kikuchi | G06F 3/121 358/1.14 |
| 2008/0022101 A1* | 1/2008 | Sung | H04L 9/0825 713/171 |
| 2008/0231895 A1* | 9/2008 | Yamazaki | H04N 1/00347 358/1.15 |
| 2009/0237702 A1* | 9/2009 | Yun | H04N 1/00244 358/1.13 |
| 2013/0229673 A1* | 9/2013 | Nakayama | H04N 1/00127 358/1.13 |

FOREIGN PATENT DOCUMENTS

| JP | 6-253075 A | 9/1994 |
| JP | 11-317832 A | 11/1999 |
| JP | 2005-079886 A | 3/2005 |
| JP | 2007-288776 A | 11/2007 |
| JP | 2010-004299 A | 1/2010 |
| JP | 2010-247520 A | 11/2010 |
| JP | 2011-205461 A | 10/2011 |
| JP | 2013-038642 A | 2/2013 |
| JP | 2013-048907 A | 3/2013 |

* cited by examiner

*Primary Examiner* — Miya J Cato
(74) *Attorney, Agent, or Firm* — Sughrue Mion, PLLC (57) ABSTRACT

An image processing apparatus includes an image data acquiring unit that acquires image data, and a transmitting unit that, if a first destination specified as a destination of the image data by a user is not safe, transmits the image data to a second destination different from the first destination, and transmits information indicating the second destination to the first destination.

13 Claims, 5 Drawing Sheets

| USER NAME | USER DESTINATION INFORMATION |
|---|---|
| fx30118 | XXX@fx.co.jp |
| fx30119 | YYY@fx.co.jp |
| fx30120 | ZZZ@fx.co.jp |
| fx30121 | AAA@fx.co.jp |
| ⋮ | |

FIG. 4

| USER NAME | DOWNLOAD TIME INFORMATION | STATUS INFORMATION | FORWARDING DESTINATION LOCATION INFORMATION | SPECIFIED DESTINATION INFORMATION | FORWARD TIME INFORMATION | FILE NAME | NUMBER OF FILES |
|---|---|---|---|---|---|---|---|
| fx30118 | 03/19/2014/ 15:15:00 | DOWNLOADED, DELETED | XXX.co.jp// | 10.128.128.128 | 03/19/2014/ 12:13:00 | XXX | 2 |
| fx30119 | - | DOWNLOADED, NOT DELETED | YYY.co.jp// | XXX@fx.co.jp | - | YYY | 1 |
| fx30120 | - | NOT DOWNLOADED | XXX.co.jp// | 10.128.128.128 | - | ZZZ | 3 |
| fx30121 | - | DELETED | YYY.co.jp// | YYY@fx.co.jp | - | AAA | 1 |
| ... | | | | | | | |

FIG. 5

METHOD AND APPARATUS FOR SECURE IMAGE DATA PROCESSING

CROSS-REFERENCE TO RELATED APPLICATIONS

This application is based on and claims priority under 35 USC 119 from Japanese Patent Application No. 2014-217321 filed Oct. 24, 2014.

BACKGROUND

Technical Field

The present invention relates to an image processing apparatus, a system, and a non-transitory computer readable medium.

SUMMARY

According to an aspect of the invention, there is provided an image processing apparatus including: an image data acquiring unit that acquires image data; and a transmitting unit that, if a first destination specified as a destination of the image data by a user is not safe, transmits the image data to a second destination different from the first destination, and transmits information indicating the second destination to the first destination.

BRIEF DESCRIPTION OF THE DRAWINGS

An exemplary embodiment of the present invention will be described in detail based on the following figures, wherein.

DETAILED DESCRIPTION

The following describes an exemplary embodiment of the present invention (hereinafter simply referred to as an "exemplary embodiment") with reference to the accompanying drawings.

(1. Hardware Configuration of Image Processing Apparatus)

Figure 1:
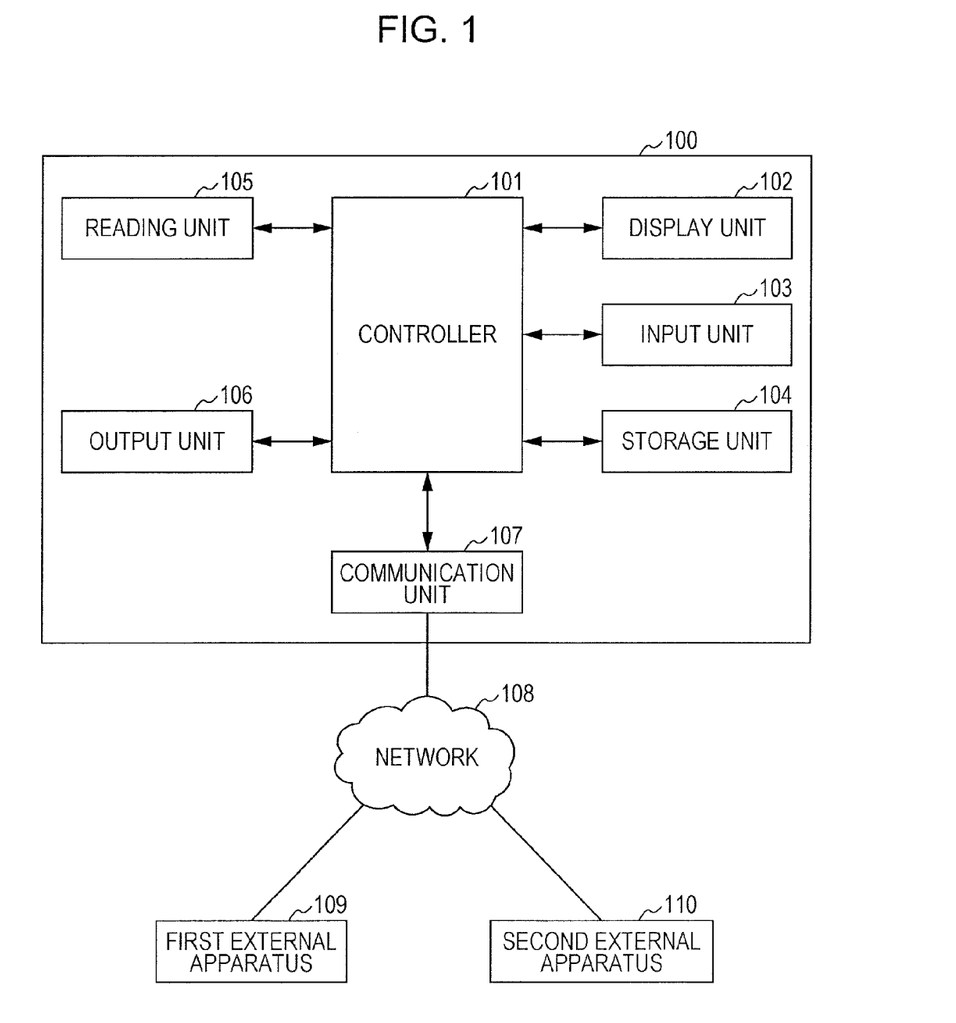
FIG. 1 illustrates the hardware configuration of an image processing apparatus and an example of apparatuses connected to the image processing apparatus.

FIG. 1 illustrates the hardware configuration of an image processing apparatus 100 and an example of apparatuses connected to the image processing apparatus 100 according to an exemplary embodiment of the invention. As illustrated in FIG. 1, the image processing apparatus 100 includes a controller 101, a display unit 102, an input unit 103, a storage unit 104, a reading unit 105, an output unit 106, and a communication unit 107. The image processing apparatus 100 may further include an operation unit, a power switch, and the like, in addition to the components illustrated in FIG. 1.

The controller 101 includes a central processing unit (CPU). The controller 101 performs various types of computations, and controls each component of the image processing apparatus 100, in accordance with programs stored in the storage unit 104. The details of the controller 101 will be described below.

The display unit 102 is implemented using a display apparatus such as a liquid crystal display. The display unit 102 displays the result (screen) of information processing performed by the controller 101.

The input unit 103 is implemented using an input device such as a touch panel and button keys, and receives an operation input from the user.

The storage unit 104 includes information storage media such as a ROM, a RAM, and a hard disk, for example. The storage unit 104 is an information storage medium that stores programs executed by the controller 101. The storage unit 104 serves also as a working memory of the controller 101, for example. Various types of memories may be used as the storage unit 104. For example, the storage unit 104 may be implemented using a storage device such as a semiconductor memory. Further, programs and various types of data to be stored in the storage unit 104 in the exemplary embodiment may be acquired from a first external apparatus 109 and a second external apparatus 110 via the communication unit 107, or may be acquired from an external storage medium.

The reading unit 105 includes a scanner. The reading unit 105 optically scans an object such as paper so as to read the image of the object.

The output unit 106 includes a printing unit that forms an image on a sheet (recording medium) such as paper. The output unit 106 prints (outputs) image data and the like on a sheet such as paper, under the control of the controller 101.

The communication unit 107 includes a communication interface, and performs wired or wireless data communication with the first external apparatus 109 and the second external apparatus 110 connected to the image processing apparatus 100. For example, as illustrated in FIG. 1, the communication unit 107 communicates with the first external apparatus 109 and the second external apparatus 110 via a network 108. Further, the communication unit 107 includes, for example, a network interface card (NIC) or the like. In FIG. 1, the image processing apparatus 100 includes only one communication unit 107. However, the image processing apparatus 100 may include plural communication units 107.

The network 108 may be a local area network (LAN), the Internet, an intranet, a next generation network (NGN), or the like.

Each of the first external apparatus 109 and the second external apparatus 110 includes a server computer, a mobile terminal, or the like. The first external apparatus 109 is an external apparatus specified as the destination by the user. The second external apparatus 110 is an external apparatus that becomes an alternative destination to the first external apparatus 109 when a determining unit (described below) determines that the first external apparatus 109 specified as the destination by the user is not safe. Further, plural first external apparatuses 109 and plural second external apparatuses 110 may be connected to the network 108.

In the above exemplary embodiment, an example is illustrated in which each of the destination specified by the user and the alternative destination is an external apparatus outside the image processing apparatus 100. However, the hardware configuration is not limited to the configuration of the above exemplary embodiment. More specifically, for example, each of the destination specified by the user and the alternative destination may be the storage unit 104 provided inside the image processing apparatus 100.

(2. Functions Implemented in Controller)

Figure 2:
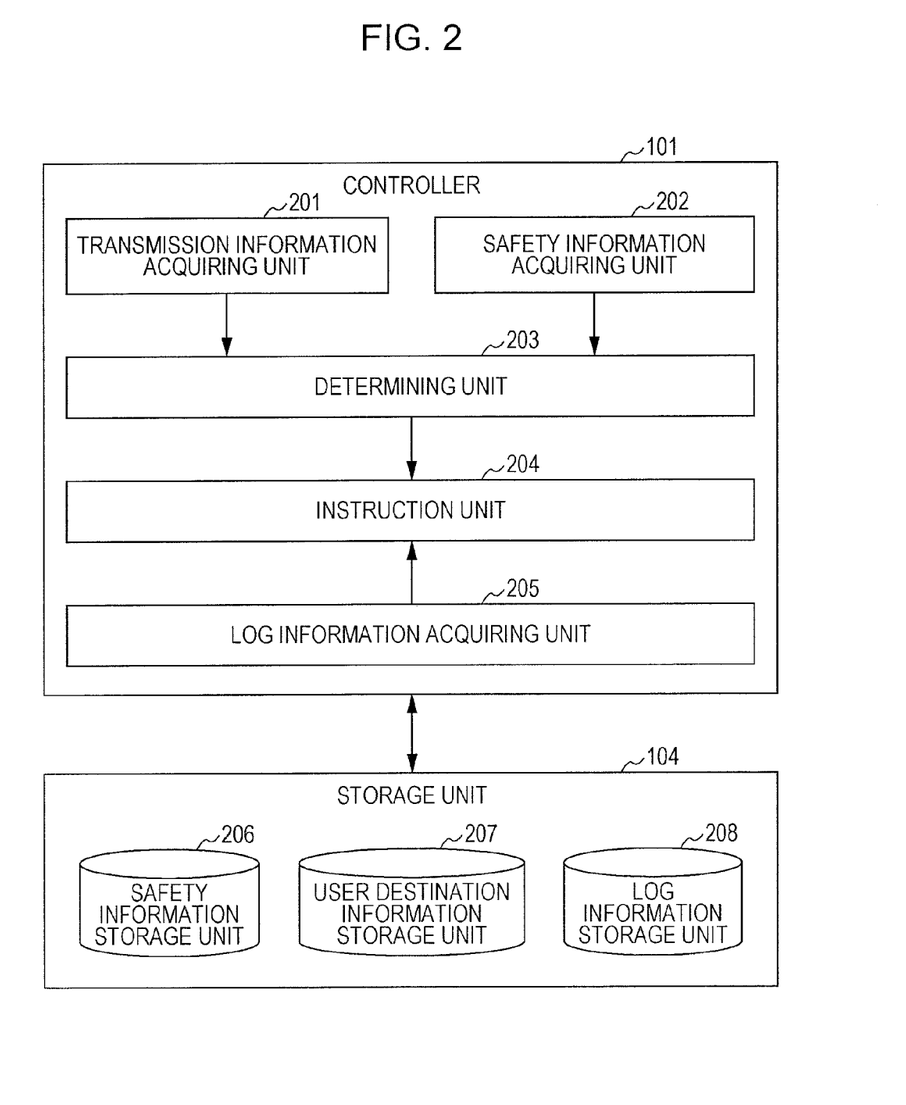
FIG. 2 illustrates the functional configuration of a controller.

FIG. 2 is a functional block diagram illustrating the image processing apparatus 100. As illustrated in FIG. 2, the controller 101 includes, as its functions, a transmission information acquiring unit 201, a safety information acquiring unit 202, a determining unit 203, an instruction unit 204, and a log information acquiring unit 205. The storage unit 104 includes, as its functions, a safety information storage unit 206, a user destination information storage unit 207, and a log information storage unit 208. Each function illustrated in FIG. 2 is executed when the controller 101 executes a program stored in the storage unit 104.

The transmission information acquiring unit 201 acquires transmission information including image data and specified-destination information indicating the destination specified by the user. More specifically, for example, the transmission information acquiring unit 201 acquires transmission information including image data read by the reading unit 105 and address information input to the input unit 103 by the user. Note that image data acquired by the transmission information acquiring unit 201 is not limited to image data read by the reading unit 105. More specifically, for example, the transmission information acquiring unit 201 may acquire image data stored in the storage unit 104 of the image processing apparatus 100, or may acquire image data from an apparatus outside the image processing apparatus 100 via the network 108.

The safety information acquiring unit 202 acquires safety information to be used for determining whether the specified destination indicated by the specified-destination information is a safe destination or an unsafe destination. A specific example of the safety information will be described below in detail.

The safety information is, for example, information including network identification information for identifying the network 108 through which image data or location information is transmitted from the image processing apparatus 100 to the specified destination. More specifically, the safety information includes network identification information indicating the type of network, such as the Internet or an intranet, of the network 108 through which image data or location information is transmitted from the image processing apparatus 100 to the specified destination. Note that the method of identifying whether the network 108 is the Internet or an intranet uses a conventional technique and therefore will not be described herein. Further, in the case where the image processing apparatus 100 includes plural communication interfaces, the safety information may include network identification information for identifying the network 108 through which image data or location information is transmitted from the image processing apparatus 100 to the specified destination. Note that in the case where there are plural communication interfaces, different communication interfaces may be used when transmitting image data to the first external apparatus 109 and when transmitting image data to the second external apparatus 110.

The safety information may be, for example, information including external apparatus identification information for identifying one or more first external apparatuses 109. More specifically, for example, in the case where an IP address assigned to the first external apparatus 109 is specified as the destination, the safety information may include external apparatus identification information, such as "10.0.0.0 through 10.255.255.255", for identifying that the IP address assigned to the first external apparatus 109 is a private address. Further, in the case where a fully qualified domain name (FQDN) assigned to the first external apparatus 109 is specified as the destination, or in the case where mail address is specified as the destination, the safety information may be information including external apparatus identification information indicating a predetermined domain name. Further, in the case where the first external apparatus 109 is managed by a management system such as mobile device management (MDM) and mobile application management (MAM), the safety information may be information including external apparatus identification information for identifying the first external apparatus 109 itself, such as the serial number of the first external apparatus 109 and the MAC address.

Further, the safety information may include encryption method information indicating one or more encryption methods. More specifically, for example, the safety information may include information indicating plural types of encryption methods applied to the image data, when the image data is transmitted from the image processing apparatus 100 to the first external apparatus 109.

The determining unit 203 determines the safety of the specified destination. Note that the determining unit 203 uses safety information described above when making a determination. A determination made by the determining unit 203 will be described below in detail.

The determining unit 203 determines the safety of the specified destination on the basis of, for example, the type of the network 108 indicated by the network identification information. More specifically, if the network 108 through which image data or location information is to be transmitted from the image processing apparatus 100 to the specified destination is the Internet, the determining unit 203 determines that the specified destination is unsafe. On the other hand, if the network 108 is an intranet, the determining unit 203 determines that the specified destination is safe. Further, in the case where the image processing apparatus 100 includes plural communication interfaces, if the network 108 to be connected using a communication interface that is used when image data or location information is transmitted from the image processing apparatus 100 to the specified destination is the Internet, the determining unit 203 may determine that the specified destination is unsafe. On the other hand, if the network 108 is an intranet, the determining unit 203 may determine that the specified destination is safe.

Note that the determining unit 203 may determine the safety of the specified destination on the basis of, for example, whether the first external apparatus 109 as the specified destination is included in external apparatuses indicated by the external apparatus identification information. More specifically, in the above example, if an IP address "10.128.128.128" assigned to the first external apparatus 109 is specified as the destination, since the IP address is included in the external apparatus identification information "10.0.0.0 through 10.255.255.255", the determining unit 203 may determine that the specified destination is a safe destination.

Further, for example, in the case where an FQDN or a mail address assigned to the first external apparatus 109 is specified as the destination, the determining unit 203 may determine that the specified destination is a safe destination or an unsafe destination on the basis of whether the domain indicated by the FQDN or the mail address is included in domains indicated by the external apparatus identification information. More specifically, if the specified mail address is "YYY@fx.com" and the domain indicated by the external apparatus identification information is "fx.com", the determining unit 203 may determine that the specified destination is a safe destination.

Further, in the case where the safety information includes the external apparatus identification information, the determining unit 203 may determine the safety of the specified destination on the basis of whether the identification information of the first external apparatus 109 as the specified destination is included in predetermined external apparatus identification information. More specifically, in the case where the first external apparatus 109 is managed by a management system such as MDM and MAM, if the external apparatus identification information such as the serial number of the first external apparatus 109 or the MAC address is included in predetermined external apparatus identification information, the determining unit 203 may determine that the specified destination is safe.

Further, the determining unit 203 may determine the safety of the specified destination on the basis of whether the system of encryption applied to image data is included in encryption methods indicated by the encryption method information. More specifically, for example, if an encryption method specified by the user logging in the image processing apparatus 100 is included in encryption methods indicated by the encryption method information, the determining unit 203 may determine that the specified destination is a safe destination.

Further, if the first external apparatus 109 is on the Internet, the determining unit 203 may determine that the specified destination is an unsafe destination.

If the first external apparatus 109 specified as the destination of image data is not safe, the instruction unit 204 transmits to the second external apparatus 110 different from the first external apparatus 109, and instructs the communication unit 107 to transmit information indicating the second external apparatus 110 to the first external apparatus 109. For example, if the determining unit 203 determines that the specified destination is safe, the instruction unit 204 instructs the communication unit 107 to transmit image data to the specified first external apparatus 109. On the other hand, if the determining unit 203 determines that the specified destination is unsafe, the instruction unit 204 instructs the communication unit 107 to transmit image data to the second external apparatus 110 different from the specified first external apparatus 109, and to transmit data indicating the location of the first external apparatus 109 to the user, that is, to issue a notification to the user.

As an example, the following describes the case in which the instruction unit 204 instructs the communication unit 107 to transmit image data read by the user to a specified mobile terminal. First, the safety of the specified destination is determined by the determining unit 203 as described above. If the determining unit 203 determines that the destination is safe, the instruction unit 204 instructs the communication unit 107 to transmit the read image data to the mobile terminal. On the other hand, if the determining unit 203 determines that the destination specified by the user is unsafe, the instruction unit 204 instructs the communication unit 107 to transmit the read image to a predetermined server instead of the specified mobile terminal, and to transmit information including the uniform resource locator (URL) indicating the location of the server to the mobile terminal.

Having received the information including the URL, the mobile terminal connects to the server indicated by the URL in accordance with an instruction from the user of the mobile terminal. Then, the user performs an authentication operation such as entering a password upon establishing the connection. If the authentication succeeds, the image data transmitted to the server is downloaded from the server to the mobile terminal.

Figure 3:
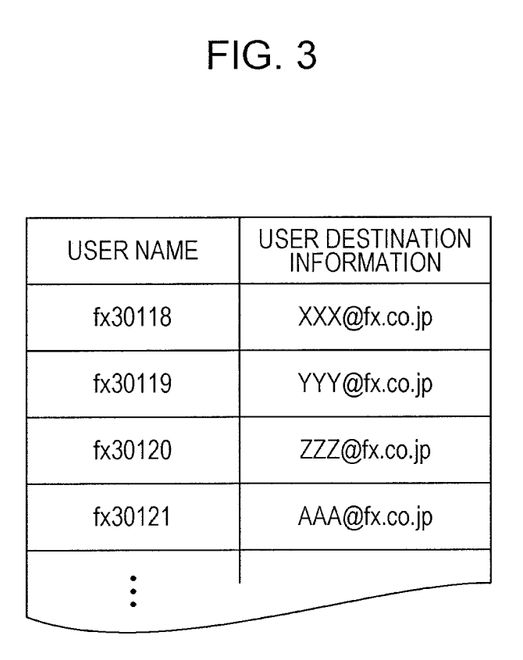
FIG. 3 illustrates an example of user destination information.

Note that, if the determining unit 203 determines that the specified destination is unsafe, the instruction unit 204 may instructs the communication unit 107 to transmit image to the second external apparatus 110 different from the specified first external apparatus 109, and to transmit data indicating the location of the first external apparatus 109 to the user logging in the image processing apparatus 100. As an example, the following describes the case in which information including the user name and user destination information indicating the destination of the user in association with each other as illustrated in FIG. 3 is stored in advance in the storage unit 104.

In this case, first, upon logging in to the image processing apparatus 100, the user enters the user name in the input unit 103. Thus, the image processing apparatus 100 acquires the user name "fx30118". Then, the instruction unit 204 may instruct the communication unit 107 to transmit URL information indicating the location of the first external apparatus 109 to a mail address "XXX@fx.co.jp" associated with the user name "fx30118".

Further, if the user logging in the image processing apparatus 100 is different from the user of the first external apparatus 109, the instruction unit 204 may instruct the communication unit 107 to transmit log information acquired by the log information acquiring unit 205 (describe below) to the user logging in the image processing apparatus 100. Similar to the above, the following describes, as an example, the case in which information including the user name and user destination information indicating the destination of the user in association with each other as illustrated in FIG. 3 is stored in advance in the storage unit 104.

In this case, first, the log information acquiring unit 205 (described below) acquires information indicating that image data has been downloaded from the second external apparatus 110 to the first external apparatus 109. Then, the instruction unit 204 instructs the communication unit 107 to transmit the information indicating that the image data has been downloaded, on the basis of the user name entered in the input unit 103 by the user upon login to the image processing apparatus 100, and the user destination information illustrated in FIG. 3. Similar to the above, if the logged-in user name is "fx30118", the instruction unit 204 instructs the communication unit 107 to transmit, to the mail address "XXX@fx.co.jp", information indicating that the image data has been downloaded.

According to the above, even if the user logging in the image processing apparatus 100 is different from the user of the first external apparatus 109 specified as the destination, the user logging in the image processing apparatus 100 notices that the image data has been downloaded. In the above, the communication unit 107 transmits, to the destination indicated by the user destination information, the information indicating that the image data has been downloaded. However, the instruction unit 204 may instruct the display unit 102 to display the information such that the user logging in the image processing apparatus 100 notices that the image data has been downloaded.

If the content of each information item included in the log information is updated, the log information acquiring unit 205 acquires the log information. The details of the log information will be described below. For example, the log information acquiring unit 205 acquires log information indicating that image data has been transmitted from the image processing apparatus 100 to the first external apparatus 109 or the second external apparatus 110, log information indicating that information indicating the second external apparatus 110 has been transmitted to the first external apparatus 109, and log information indicating that image data has been downloaded from the second external apparatus 110 to the first external apparatus 109.

More specifically, if the first external apparatus 109 is determined to be safe and image data is transmitted to the first external apparatus 109, the log information acquiring unit 205 acquires log information indicating that the image data has been transmitted from the image processing apparatus 100 to the first external apparatus 109.

On the other hand, if the first external apparatus 109 is determined not to be safe and image data is transmitted to the second external apparatus 110, the log information acquiring unit 205 acquires log information indicating that the image data has been transmitted from the image processing apparatus 100 to the second external apparatus 110. In this case, information indicating the second external apparatus 110 is transmitted from the image processing apparatus 100 to the first external apparatus 109. Accordingly, the log information acquiring unit 205 also acquires log information indicating that the information indicating the second external apparatus 110 has been transmitted from the image processing apparatus 100 to the first external apparatus 109.

Further, when the image data is downloaded from the second external apparatus 110 to the first external apparatus 109 after the image data is transmitted from the image processing apparatus 100 to the second external apparatus 110, the log information acquiring unit 205 acquires information indicating that the image data has been downloaded from the second external apparatus 110 to the first external apparatus 109. The log information acquiring unit 205 may acquire log information indicating that the image data has been downloaded from the second external apparatus 110, by querying the second external apparatus 110 whether the image data has been downloaded at regular time intervals (so-called polling). In the case where the log information acquiring unit 205 performs polling, even if the second external apparatus 110 is not connected to the intranet and is not able to directly access the image processing apparatus 100 due to a firewall or the like, the log information acquiring unit 205 acquires the log information from the second external apparatus 110.

Figure 4:
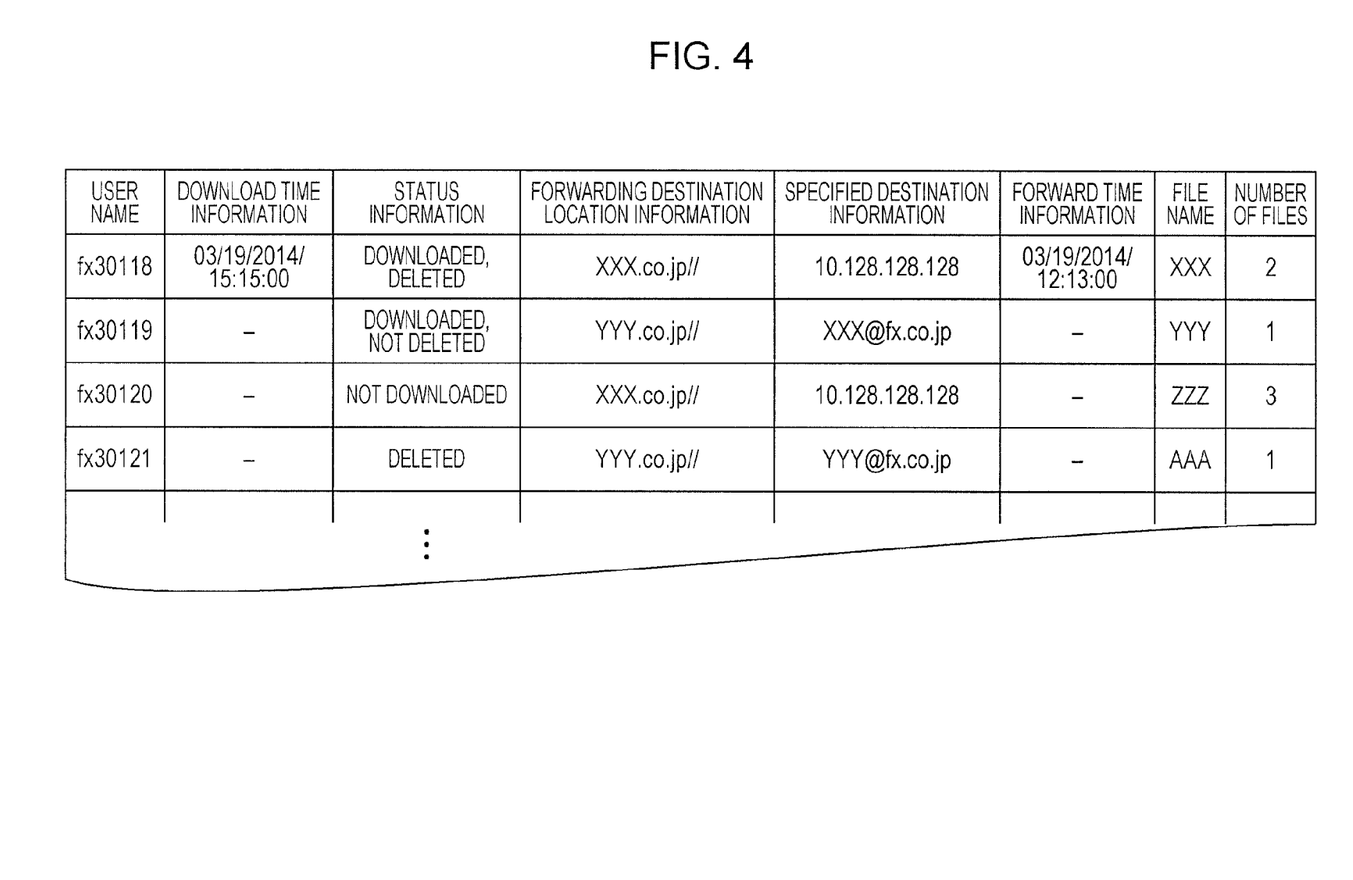
FIG. 4 illustrates an example of log information.

As illustrated, for example, in FIG. 4, the log information is, more specifically, information including the user name, download time information, status information, forwarding destination location information, specified-destination information, forward time information, the file name, and the number of files in association with each other. The user name indicates, for example, the user name entered in the input unit 103 by the user upon login to the image processing apparatus 100.

The download time information is information indicating the time when the image data is downloaded from the second external apparatus 110 to the first external apparatus 109. More specifically, for example, download time information in the second row of FIG. 4 indicates that image data to be transmitted to the destination specified by the user with the user name "fx30118" is downloaded from the forwarding destination server to a specified mobile terminal on "2014/03/19/15:15:00".

The status information is information indicating whether the image data transmitted to the first external apparatus 109 is downloaded, and/or whether the image data is stored in the image processing apparatus 100 or the second external apparatus 110. More specifically, for example, status information in the second row of FIG. 4 indicates that the image data is already downloaded and is deleted.

The forwarding destination location information is information indicating the location of the second external apparatus 110 to which the image data is transmitted in the case where the determining unit 203 determines that the specified destination is unsafe. More specifically, for example, forwarding destination location information in the second row of FIG. 4 indicates that the location of the second external apparatus 110 to which the image data is transmitted is an URL "XXX.co.jp//".

The specified-destination information is information indicating the destination specified by the user. More specifically, for example, specified-destination information in the second row of FIG. 4 indicates that the destination specified by user is the IP address "10.128.128.128". Note that the forwarding destination location information and the specified-destination information are not limited to an URL and an IP address, respectively, and may be in any other format as long as the forwarding destination location information and the specified-destination information are information indicating the location of the destination specified by the user.

The forward time information is information indicating the time when the image data is transmitted to the second external apparatus 110 in the case where the determining unit 203 determines that the specified destination is unsafe. More specifically, for example, forward time information in the second row of FIG. 4 indicates that the image data is transmitted to the second external apparatus 110 on "2014/03/19/12:13:00".

The file name is information indicating the name of a file included in the image data transmitted to the destination specified by the user. More specifically, for example, the file name in the second row of FIG. 4 indicates that the file name included in the image data is "XXX". Note that the file name is determined by being entered in the input unit 103 by the user logging in the image processing apparatus 100, for example. Further, in the case where the number of files described below is plural, the files may have different file names.

The number of files is information indicating the number of files included in the image data transmitted to the destination specified by the user. More specifically, for example, the number of files in the second row of FIG. 4 indicates that the number of files included in the image data is "2". Note that the number of files is determined by the number of sheets that the reading unit 105 is caused to read in one operation by the user logging in the image processing apparatus 100, for example.

Note that, in the above example, the log information includes the user name, download time information, status information, forwarding destination location information, specified-destination information, forward time information, the file name, and the number of files. However, the log information may include only a part of these information items, and may include other information items related to the image data.

If the content of each information item included in the log information described above is updated, the log information acquiring unit 205 acquires updated log information. As an example, the following describes the case in which the image data is transmitted to a server different from the specified destination, and the image data is not downloaded to the mobile terminal specified by the user. In this case, the log information of the image data includes status information "not downloaded". After that, when the image data is downloaded to the mobile terminal and is deleted from the server, the log information acquiring unit 205 acquires status information "downloaded, deleted" as the status information of the log information. Note that the method for the log information acquiring unit 205 to acquire log information uses a conventional technique and therefore will not be described herein.

The safety information storage unit 206, the user destination information storage unit 207, and the log information storage unit 208 respectively store the safety information, the user destination information, and the log information described above.

Note that, in the functional configuration illustrated in FIG. 2, the controller 101 includes the log information acquiring unit 205. However, the controller 101 does not have to include the log information acquiring unit 205. Further, in FIG. 2, the storage unit 104 includes the safety information storage unit 206, the user destination information storage unit 207, and the log information storage unit 208. However, each of these units may be provided outside the image processing apparatus 100.

(3. Processing Performed by Image Processing Apparatus)

Figure 5:
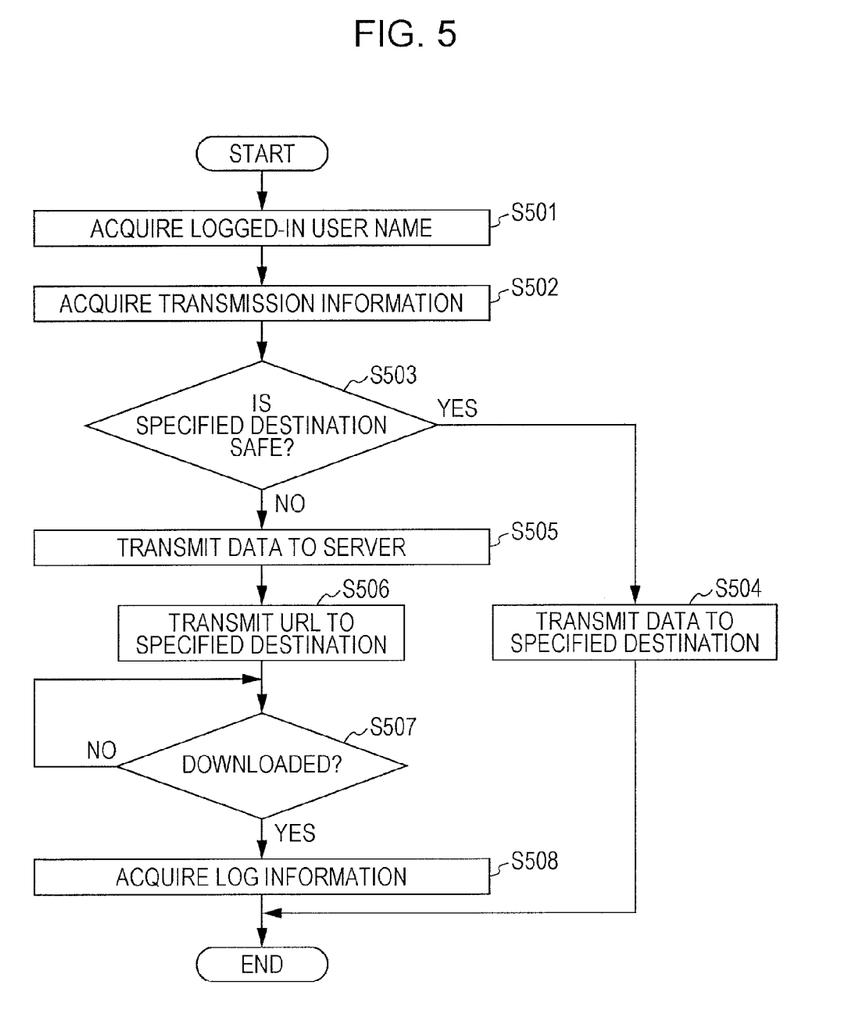
FIG. 5 is a flowchart illustrating processing performed by the image processing apparatus.

The following describes processing performed by the image processing apparatus 100. FIG. 5 is a flowchart illustrating processing performed by the image processing apparatus 100 in the process in which the user transmits image data to the specified destination and the user acquires the image data. The controller 101 performs the processing illustrated in FIG. 5 in accordance with a program stored in the storage unit 104. This processing is performed when image data to be transmitted and the destination are specified by the user.

First, the input unit 103 receives an input of a user name when the user logs in to the image processing apparatus 100. More specifically, for example, the input unit 103 receives an input of the user name "fx30118" (S501).

Then, the transmission information acquiring unit 201 acquires transmission information including image data and specified-destination information. More specifically, for example, the transmission information acquiring unit 201 acquires image data read by the reading unit 105 and transmission information including the specified-destination information "10.128.128.128" (S502).

Then, the determining unit 203 determines whether the specified destination is a safe destination or an unsafe destination, on the basis of predetermined safety information (S503). If the determining unit 203 determines that the specified destination is safe, the process proceeds to step S504. If the determining unit 203 determines that the specified destination is unsafe, the process proceeds to step S505. More specifically, as in the above example, if the safety information includes external apparatus identification information "10.0.0.0 through 10.255.255.255", the determining unit 203 determines that the specified destination is safe.

If the determining unit 203 determines that the specified destination is safe in step S503, the instruction unit 204 instructs the communication unit 107 to transmit image data to the specified destination. Thus, the communication unit 107 transmits the image data to the specified destination (S504). More specifically, in the above example, the instruction unit 204 instructs the communication unit 107 to transmit the read image data to the first external apparatus 109 having the IP address "10.128.128.128". Thus, the communication unit 107 transmits the image data to the specified destination.

On the other hand, if the determining unit 203 determines that the specified destination is unsafe in step S503, the instruction unit 204 instructs the communication unit 107 to transmit image data to the second external apparatus 110. Thus, the communication unit 107 transmits the image data to the second external apparatus 110 (S505). More specifically, in the above example, the instruction unit 204 instructs the communication unit 107 to transmit the image data to the server. Thus, the communication unit 107 transmits the read image data to the server.

Further, the instruction unit 204 transmits location information indicating the location of the second external apparatus 110 to the first external apparatus 109 (S506). More specifically, in the above example, the instruction unit 204 transmits location information "XXX.co.jp//" indicating the location of the server to the first external apparatus 109 having the IP address "10.128.128.128". Note that step S505 and step S506 may be performed in any order. That is, either step may be performed first.

After step S506, if the image data is downloaded from the second external apparatus 110 to the first external apparatus 109, the process proceeds to step S508. If not, the process repeats step S507 (S507). In step S507, if the image data is downloaded, the log information acquiring unit 205 acquires log information indicating that the image data has been downloaded (S508).

In the manner described above, image data is transmitted only to the first external apparatus 109 that is determined to be a safe destination. If an unsafe destination is specified, the image data is transmitted to a safe server.

The present invention is not limited to the exemplary embodiment and modifications described above, and various modifications are possible. The configuration of the image processing apparatus 100 and the flowchart are only examples and are not intended to limit the scope of the invention. The configuration may be replaced with the substantially same configuration as the configuration illustrated in the exemplary embodiment and modifications described above, a configuration that provides the same functions and effects, or a configuration that accomplishes the same object.

Further, a first destination described in Claims corresponds to the first external apparatus 109 described above, and a second destination described in Claims corresponds to the second external apparatus 110 described above. However, each of the first and second destinations is not limited to an external apparatus outside the image processing apparatus 100, and may be a storage unit provided inside the image processing apparatus 100.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a memory configured to store safety information of image data, the safety information for determining whether the image processing apparatus is permitted to transmit the image data to a transmission destination of the image data;
a processor configured to acquire image data; and
a transmitter configured to transmit the image data to the transmission destination,
wherein the processor is further configured to receive input of a first destination specified as the transmission destination of the image data, determine that the first destination does not satisfy the safety information of the image data, control the transmitter to transmit the image data to a second destination different from the first destination in response to determining that the first destination does not satisfy the safety information of the image data, and controls the transmitter to indicate to the first destination that the image data is transmitted to the second destination, and
wherein the memory is further configured to store a log that indicates the image data is downloaded from the second destination to the first destination.

2. The image processing apparatus according to claim 1, wherein the processor is further configured to control the transmitter to transmit information indicating the second destination to address information of the user.

3. The image processing apparatus according to claim 1, wherein the safety information indicates that the image processing apparatus is permitted to transmit the image data to a private network.

4. The image processing apparatus according to claim 1, wherein the safety information indicates that the image processing apparatus is permitted to transmit the image data along a secure network route.

5. The image processing apparatus according to claim 1, wherein the safety information comprises an identifier of the transmission destination to which the image processing apparatus is permitted to transmit the image data.

6. The image processing apparatus according to claim 1, wherein the safety information comprises an encryption level of the transmission destination.

7. A system comprising:
a server; and
an image processing apparatus comprising:
a memory configured to store safety information of image data, the safety information for determining whether the image processing apparatus is permitted to transmit the image data to a transmission destination of the image data;
a processor configured to acquire image data; and
a transmitter configured to transmit the image data to the transmission destination,
wherein the processor is further configured to receive input of a first destination specified as the transmission destination of the image data, determine that the first destination does not satisfy the safety information of the image data, control the transmitter to transmit the image data to the server in response to determining that the first destination does not satisfy the safety information of the image data, and controls the transmitter to indicate to the specified destination that the image data is transmitted to the server, and
wherein the memory is further configured to store a log that indicates the image data is downloaded from the server to the first destination.

8. The system according to claim 7, wherein the processor is further configured to control the transmitter to transmit information indicating the second destination to address information of the user.

9. The system according to claim 7, wherein the safety information indicates that the image processing apparatus is permitted to transmit the image data to a private network.

10. The system according to claim 7, wherein the safety information indicates that the image processing apparatus is permitted to transmit the image data along a secure network route.

11. The system according to claim 7, wherein the safety information comprises an identifier of the transmission destination to which the image processing apparatus is permitted to transmit the image data.

12. The system according to claim 7, wherein the safety information comprises an encryption level of the transmission destination.

13. A non-transitory computer readable medium storing a program causing an image processing apparatus to execute a method of image processing, the method comprising:
storing safety information of image data, the safety information for determining whether the image processing apparatus is permitted to transmit the image data to a transmission destination of the image data;
acquiring the image data;
receiving input of that, if a first destination specified as a the transmission destination of the image data by a user is not safe;
determining that the first destination does not satisfy the safety information of the image data;
transmitting the image data to a second destination different from the first destination in response to determining that the first destination does not satisfy the safety information of the image data;
transmitting information to the first destination indicating that the image data is transmitted to the second destination; and
storing, in response to the first destination downloading the image data from the second destination, a log that indicates the image data is downloaded from the second destination to the first destination.

* * * * *